(12) United States Patent
Matsunaga et al.

(10) Patent No.: US 7,804,659 B2
(45) Date of Patent: Sep. 28, 2010

(54) METHOD AND APPARATUS FOR POSITIONING HEAD USING SPIRAL SERVO PATTERN IN A DISK DRIVE

(75) Inventors: Toshitaka Matsunaga, Ome (JP); Masahide Yatsu, Akishima (JP); Hideo Sado, Ome (JP); Katsuki Ueda, Tachikawa (JP); Shouji Nakajima, Kodaira (JP); Seiji Mizukoshi, Nishitama-gun (JP); Shinichirou Kouhara, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 410 days.

(21) Appl. No.: 11/942,486

(22) Filed: Nov. 19, 2007

(65) Prior Publication Data

US 2008/0151414 A1    Jun. 26, 2008

(30) Foreign Application Priority Data

Dec. 26, 2006    (JP) ............................. 2006-350014

(51) Int. Cl.
*G11B 21/02* (2006.01)
(52) U.S. Cl. ...................................... 360/75
(58) Field of Classification Search ................. None
See application file for complete search history.

(56) References Cited

U.S. PATENT DOCUMENTS

| 4,454,549 | A | 6/1984 | Pennington |
| 6,987,636 | B1 | 1/2006 | Chue et al. |
| 7,088,533 | B1 * | 8/2006 | Shepherd et al. ............... 360/75 |
| 7,312,943 | B2 * | 12/2007 | Lau et al. ........................ 360/75 |
| 7,375,918 | B1 * | 5/2008 | Shepherd et al. ......... 360/78.14 |
| 7,471,481 | B2 * | 12/2008 | Lau et al. ........................ 360/75 |
| 7,477,472 | B2 * | 1/2009 | Sado et al. ...................... 360/75 |
| 2006/0152845 | A1 | 7/2006 | Asakura et al. |
| 2007/0253084 | A1 * | 11/2007 | Annampedu et al. .......... 360/75 |

FOREIGN PATENT DOCUMENTS

JP    2003-217241    7/2003

* cited by examiner

*Primary Examiner*—Hoa T Nguyen
*Assistant Examiner*—James L Habermehl
(74) *Attorney, Agent, or Firm*—Pillsbury Winthrop Shaw Pittman, LLP

(57) ABSTRACT

According to one embodiment, there is to provide a disk drive which calculates an error in the position of a head on the basis of concentric servo patterns. The disk drive has a disk medium on which spiral servo patterns are recorded and a read head which reads the spiral servo patterns from the disk medium. A servo controller reproduces a hexagonal burst signal from the spiral servo patterns read by the read head to generate position data associated with servo burst signals. The CPU uses the position data to perform a position error calculation.

4 Claims, 10 Drawing Sheets

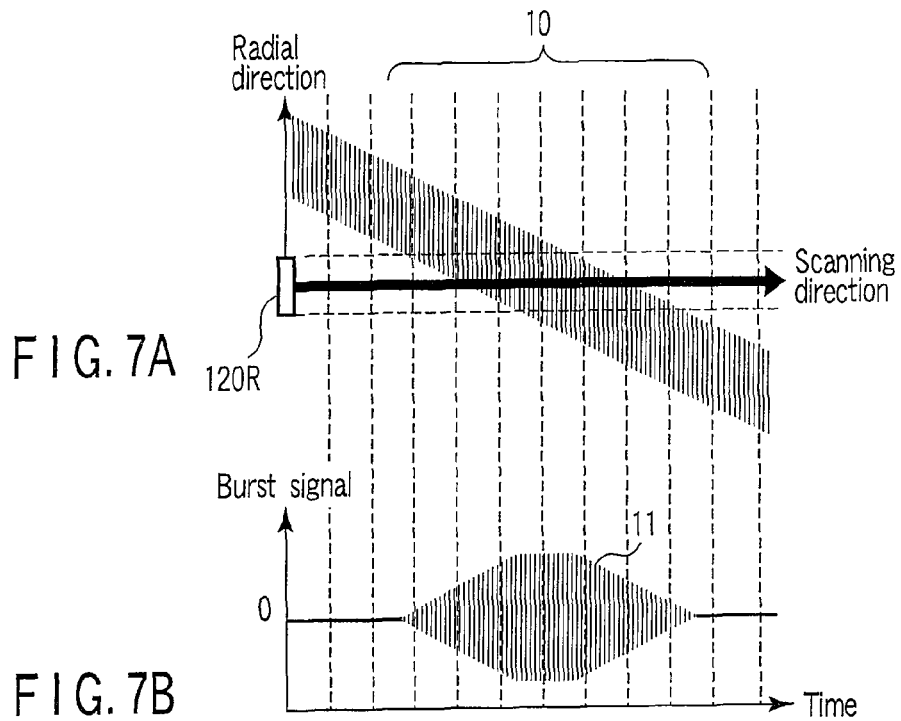
FIG. 7A
FIG. 7B
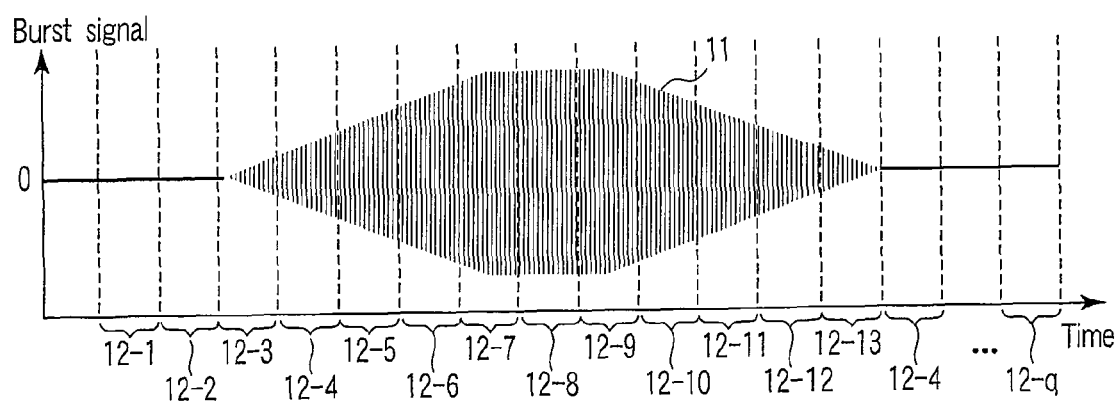
FIG. 8

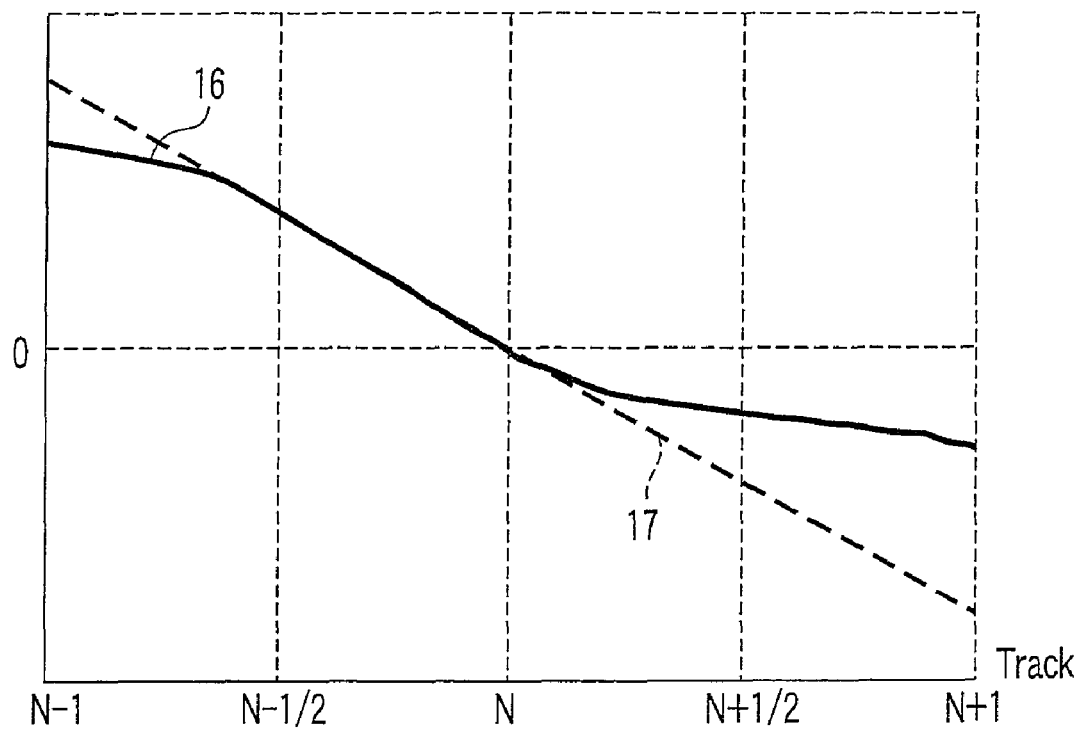
F I G. 14

METHOD AND APPARATUS FOR POSITIONING HEAD USING SPIRAL SERVO PATTERN IN A DISK DRIVE

CROSS-REFERENCE TO RELATED APPLICATIONS

This application is based upon and claims the benefit of priority from Japanese Patent Application No. 2006-350014, filed Dec. 26, 2006, the entire contents of which are incorporated herein by reference.

BACKGROUND

1. Field

One embodiment of the present invention relates to a disk drive, and in particular, to a head positioning control technique using spiral servo patterns.

2. Description of the Related Art

In general, in disk drives typified by hard disk drives, servo patterns (servo data) used for head positioning control are recorded on a disk medium that is a data recording medium. The disk drive uses the servo patterns read by the head to controllably place the head at a target position (target track) on the disk medium.

The servo patterns recorded on the disk medium are concentric servo patterns having a plurality of servo sectors normally arranged circumferentially at a fixed interval so as to constitute concentric servo tracks.

The concentric servo patterns are recorded on the disk medium by a servo writing step included in a disk drive manufacturing process. A proposal has been made of a method of recording a plurality of spiral servo patterns constituting base patterns (seed patterns) on the disk medium during the servo writing step (see, for example, U.S. Pat. No. 6,987,636 B1).

In the servo writing step in accordance with the proposed method, a plurality of spiral servo patterns (a multi-spiral servo pattern) are recorded, by, for example, a dedicated servo track writer (STW), on the disk medium not incorporated yet into a disk drive to be shipped as a product. The disk medium is subsequently incorporated into the disk drive, which performs a servo self-write method to write concentric servo patterns used for the product, to the disk medium.

A normal disk drive uses a read head that reads the servo patterns from the disk medium and a write head that writes servo patterns to the disk medium; the read head and the write head are separately mounted in the disk drive. The width of the read head is relatively small compared to that of the write head. Thus, the waveform of burst signals reproduced from the spiral servo patterns read from the read head is hexagonal. In U.S. Pat. No. 6,987,636 B1, the burst signal waveform is processed as a rhombic signal.

In the disk drive to be shipped as a product, the concentric servo patterns are written to the disk medium as described above. To allow the write head to write the concentric servo patterns to the disk medium, positioning of the head is controlled on the basis of the spiral servo patterns read by the read head. The disk drive controls the positioning of the head by calculating an error in the position of the head on the basis of the servo burst signals reproduced from the concentric servo patterns.

However, the waveform of burst signals reproduced from the spiral servo patterns is hexagonal. Consequently, a scheme (algorithm) of calculating an error in the position of the head in the disk drive is not applicable directly to the head positioning control. The method in U.S. Pat. No. 6,987,636 B1 processes the burst signal waveform as a rhombic signal and thus allows the position error calculating scheme to be partly applied to the head positioning control. However, the method is disadvantageous in a practical sense in that the method processes the burst signal waveform as a rhombic signal and fails to completely apply the position error calculating scheme to the head positioning control.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 7A and 7B are diagrams illustrating a burst signal waveform for the spiral servo pattern in accordance with the present embodiment;

FIG. 8 is a diagram illustrating a hexagonal burst signal waveform in accordance with the present embodiment;

FIG. 14 is a diagram showing the linearity of a position error calculation in accordance with the present embodiment.

DETAILED DESCRIPTION

Various embodiments according to the invention will be described hereinafter with reference to the accompanying drawings. In general, according to one embodiment of the invention, there is provided a disk drive that allows burst signals reproduced from spiral servo patterns to be applied to a method of calculating an error in the position of a head on the basis of concentric servo patterns.

(Configuration of the Disk Drive)

Figure 1:
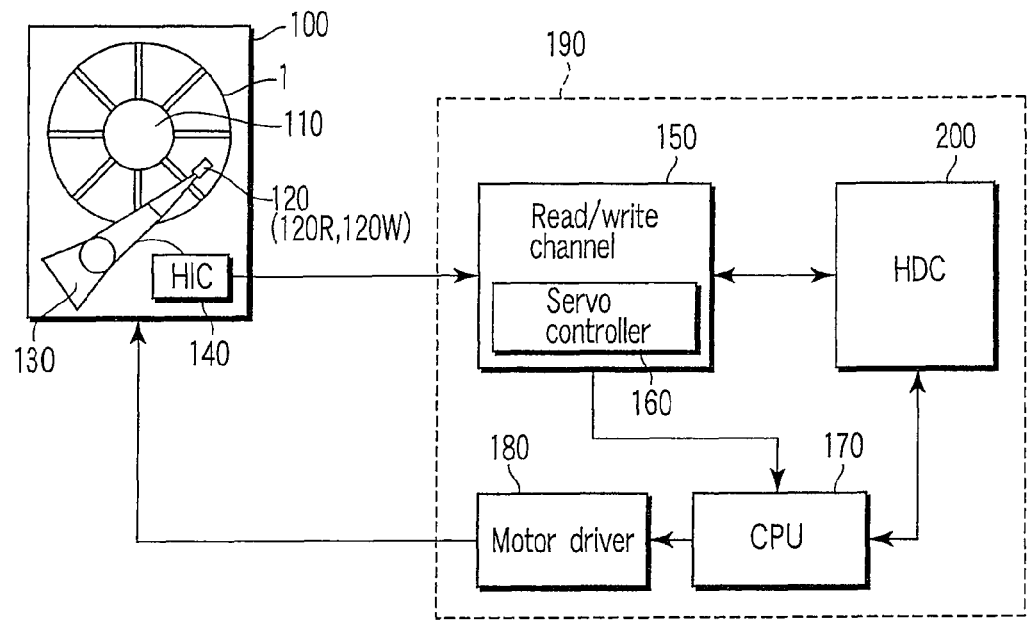
FIG. 1 is a block diagram showing an essential part of a disk drive in accordance with an embodiment of the present invention.

FIG. 1 is a block diagram showing an essential part of a disk drive in accordance with the present embodiment.

A disk drive 100 has a disk medium 1, a spindle motor 110, a head 120, an actuator 130, a head amplifier (head IC) 140, and a printed circuit board (PCB) 190.

Figure 3:
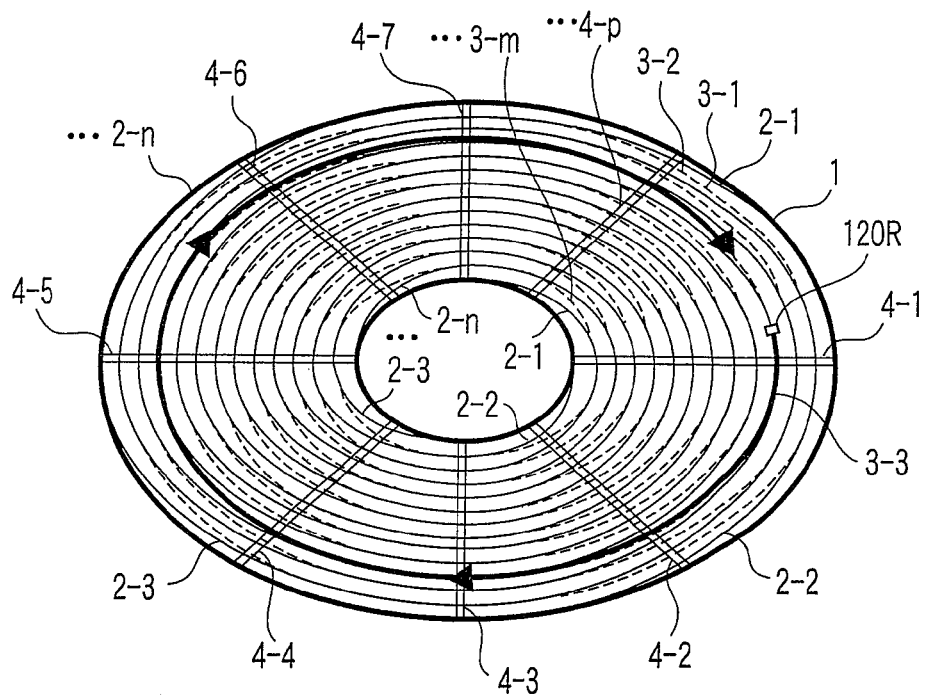
FIG. 3 is a diagram showing a disk medium on which a multi-spiral servo pattern is recorded.

The disk medium 1 is rotated at a high speed by the spindle motor 110. In the present embodiment, spiral servo patterns are recorded on the disk medium 1 as base patterns by a servo track writer (STW), as shown in FIG. 3.

The head 120 has a read head 120R and a write head 120W, and uses the read head 120R to read spiral servo patterns, concentric servo patterns, and user data from the disk medium 1. The head 120 uses the write head 120W to write user data to the disk medium in data regions different from servo sectors, and writes concentric servo patterns to the disk medium 1 during a servo self-write operation.

The actuator 130 is driven by a voice coil motor (VCM) to controllably move the mounted head 120 radially over the disk medium. The voice coil motor is controllably driven by a motor driver 180 mounted on PCB 190. The head amplifier 140 amplifies read signals read by the read head 120R and outputs the amplified read signals to a read/write channel (signal processing unit) 150 mounted on PCB 190.

The read/write channel 150, a microprocessor (CPU) 170, the motor driver 180, and a disk controller (HDC) 200 are mounted on PCB 190. The read/write channel 150 is a signal processing unit that processes read/write signals. The read/write channel 150 includes a servo controller 160 that executes a process of reproducing servo signals for the spiral servo patterns and concentric servo patterns.

The servo controller 160 includes an address code detector, a servo burst signal demodulator, and a servo data generator. The address code detector detects, in a read signal, address codes for a sector and a track (cylinder) contained in each of the concentric servo patterns. The servo burst signal demodulator demodulates servo burst signals contained in spiral servo patterns and concentric servo patterns. The servo data generator generates position error data based on the address codes detected by the address code detector and servo burst signals (A to D) and outputs the data to the CPU 170.

The motor driver 180 includes a VCM driver that supplies a drive current to the voice coil motor for the actuator 130 under the control of the CPU 170 and an SPM driver that supplies a drive current to the spindle motor 110 under the control of the CPU 170.

The HDC 200 is an interface that performs, for example, data transfers between the disk drive 100 and an external host system. The HDC 200 transfers user data output by the read/write channel 150 to the host system under the control of the CPU 170. The HDC 200 also receives data from the host system and transfers the data to the read/write channel 150. Data from the host system contains data on the concentric servo patterns to be written to the disk medium 1 by a servo self-write operation.

The CPU 170 is a main controller for the disk drive 100 and has a function for performing a servo self-write operation in accordance with the present embodiment. In the disk drive 100 shipped as a product, the CPU 170 controllably positions the head 120 on the basis of the concentric servo patterns written to the disk medium 1.

(Configuration of the Servo Track Writer)

Figure 2:
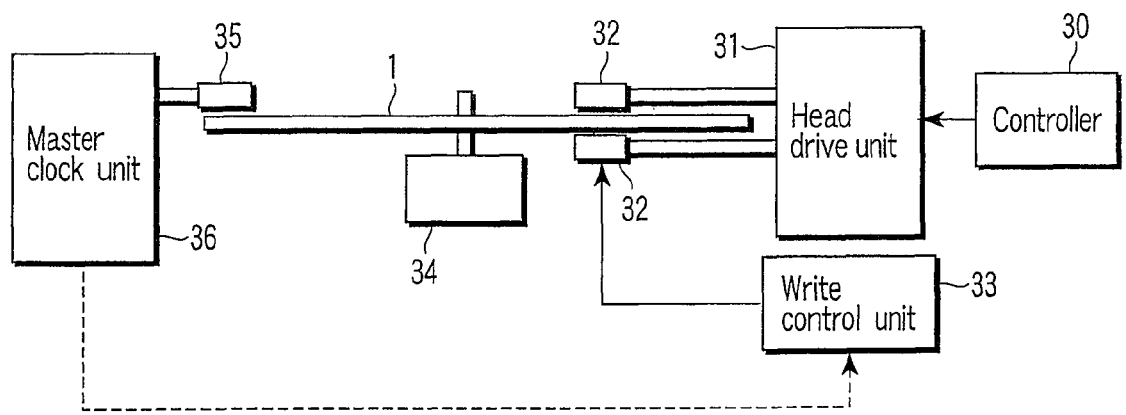
FIG. 2 is a block diagram showing an essential part of a servo track writer in accordance with the present embodiment.

FIG. 2 is a block diagram showing an essential part of the servo track writer (STW) in accordance with the present embodiment.

The servo track writer (STW) is a servo write apparatus installed in a clean room to write spiral servo patterns used as base patterns, to the disk medium 1 before the servo self-write step.

As shown in FIG. 2, the servo track writer has a controller 30, a head drive unit 31, a servo head 32, a write control unit 33, a spindle motor 34, a clock head 35, and a master clock unit 36. The disk medium to which no data is written is fixed to and rotated by the spindle motor 34. The servo head 32 is separated into a read head and a write head which are mounted on a slider. The read head reads spiral patterns from the disk medium. The write head writes spiral patterns to the disk medium.

The controller 30 have a microprocessor and a memory as main elements to control the operations of the head drive unit 31, the write control unit 33, the spindle motor 34, and the master clock unit 36. The controller 30 controls the head drive unit 31 and thus the positioning of the servo head 32.

The head drive unit 31 is an actuator on which the servo head 32 is mounted and moved to a specified position on the disk medium 1. The head drive unit 31 is driven by a voice coil motor. The write control unit 33 transmits servo data used to write spiral servo patterns, to the servo head 32. The servo head 32 writes the spiral servo patterns to the disk medium 1 on the basis of the servo data from the write control unit 33, as shown in FIG. 3.

The master clock unit 36 transmits a clock signal to the clock head 35 under the control of the controller 30. The clock head 35 writes the clock signal to the outermost peripheral region on the disk medium 1. The controller 30 references the clock signal as a reference position information signal when moving the servo head 32 from the innermost periphery toward outermost periphery of the disk medium 1 to position the servo head 32.

(Multi-Spiral Servo Pattern)

With reference to FIGS. 3, 4, 6A, and 6B, description will be given of a multi-spiral servo pattern and a burst signal waveform in accordance with the present embodiment.

FIG. 3 is a diagram conceptually showing the state of the multi-spiral servo pattern written to the entire surface of the disk medium 1 by, for example, the servo track writer shown in FIG. 2. The multi-spiral servo pattern is composed of n spiral servo patterns 2-1 to 2-n.

After the disk medium 1 on which the multi-spiral servo pattern is recorded is incorporated into the disk drive 100, a servo self-write function writes concentric servo patterns 4-1 to 4-p to the disk medium 1. In the disk drive 100, the CPU 170 uses multi-spiral servo patterns 2-1 to 2-n to allow the head 120 to write concentric servo patterns 4-1 to 4-p to (the center lines of) concentric tracks 3-1 to 3-m shown by dashed lines, while performing a tracking operation. In FIG. 3, an arrow shows that concentric track 3-3 is being scanned by a read head 120R.

Figure 4:
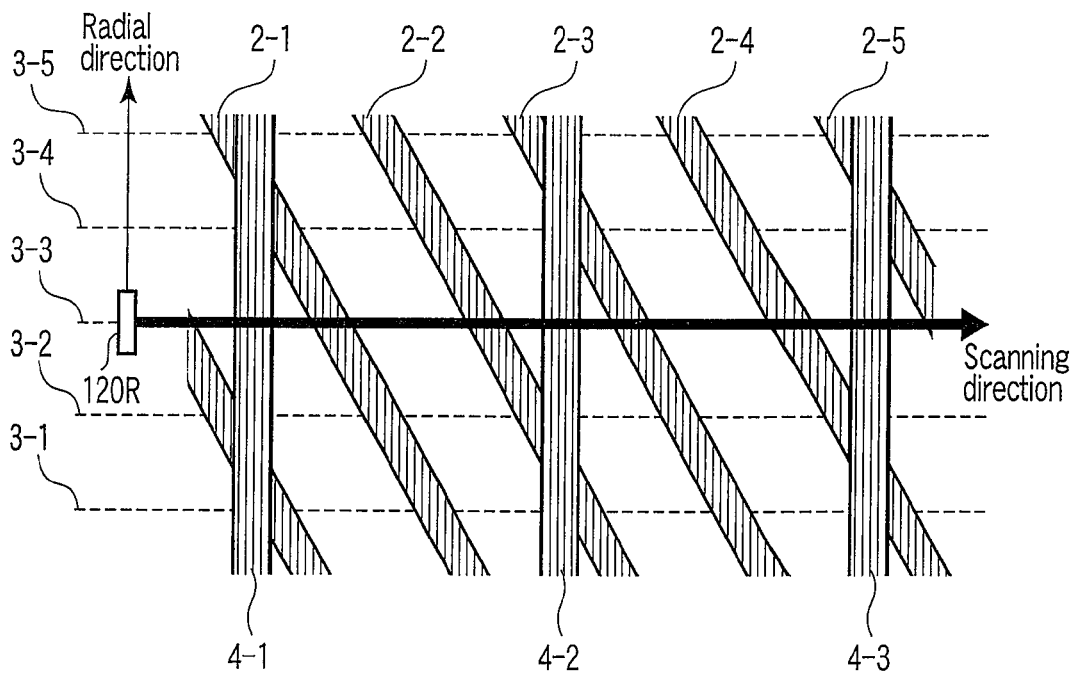
FIG. 4 is a diagram showing the positional relationship between the multi-spiral servo pattern and concentric servo patterns in accordance with the present embodiment.

FIG. 4 is a diagram showing the positional relationship between multi-spiral servo patterns 2-1 to 2-5 and concentric servo patterns 4-1 to 4-3. As shown in FIG. 4, concentric servo patterns 4-1 to 4-n are perpendicular to the direction (shown by an arrow; the circumferential direction of the disk medium 1) in which the read head 120R scans. In contrast, multi-spiral servo patterns 2-1 to 2-5 are arranged obliquely with respect to the scanning direction. Thus, the timing at which the read head 120R reads a spiral servo pattern varies depending on the radial position of the read head 120R.

In the disk drive 100, after concentric servo patterns 4-1 to 4-3 are written to the disk medium 1, the read head 120R is controllably positioned on center lines 3-1 to 3-5 of the concentric tracks on the basis of concentric servo patterns 4-1 to 4-3.

Figure 5A:
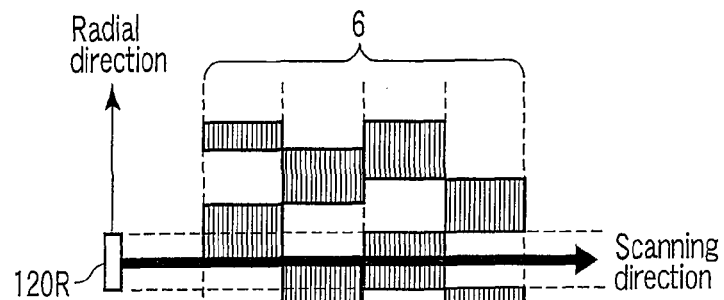
FIGS. 5A and 5B are diagrams illustrating servo burst signals for the concentric servo patterns in accordance with the present embodiment.
Figure 5B:
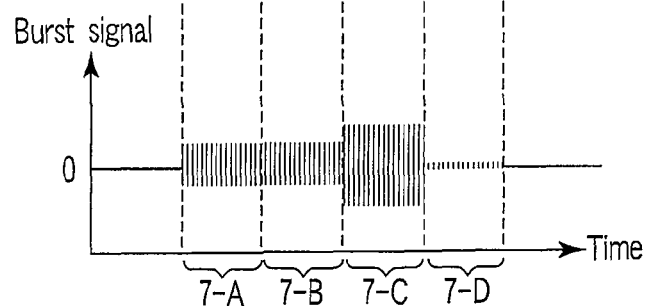

FIG. 5A shows a region 6 for servo burst signals (A to D) contained in concentric servo patterns 4-1 to 4-p. FIG. 5B shows amplitudes 7-A to 7-D of the servo burst signals (A to D) reproduced by the read head 120R passing through the servo burst signal region 6. Amplitudes 7-A to 7-D are output by the servo processing section 160 of the read/write channel 150.

The CPU 170 determines the radial position of the read head 120R on the basis of variations in amplitudes 7-A to 7-D of the servo burst signals (A to D). That is, amplitudes 7-A and 7-B of the servo burst signals (A and B) are at the same position when the read head 120R is positioned on one of center lines 3-1 to 3-m of the concentric tracks. Here, a deviation from the center line of the concentric track is called a position error.

The CPU 170 uses amplitudes 7-A to 7-D of the servo burst signals (A to D) to perform a position error calculation for calculating an error in the position of the read head 120R. On the basis of the calculation result, the CPU 170 controllably positions the read head 120R (tracking).

Specifically, the CPU 170 executes an algorithm that performs such a position error calculation as shown below in Equations 1 to 3.

$$pos1 = (A-B)/(|A-B|+|C-D|) \quad (1)$$

$$pos2 = ((A-B)*|A-B|)/(|A-B|^2+|C-D|^2) \quad (2)$$

$$POS = ((pos1*k)+((1024-k)*pos2))/1024 \quad (3)$$

In the equations, POS denotes a position error obtained by an averaging calculation in which weighting factors (K: 0 to 1024) are added to the calculation results of Equations 1 and 2, where A to D mean the amplitudes of servo burst signals A to D, |X| means the absolute value of X, "^2" means a square operation, and * means multiplication.

Figure 6A:
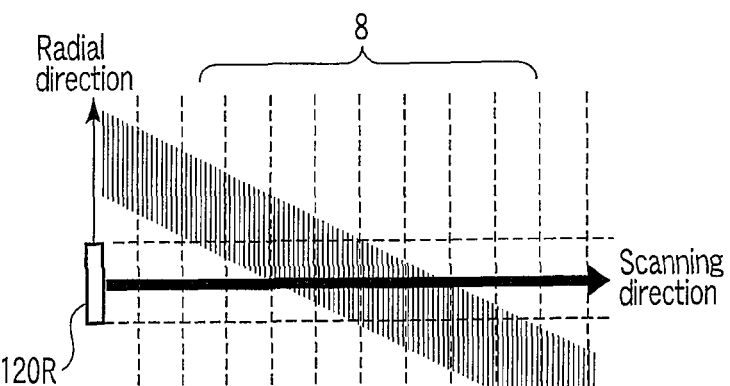
FIGS. 6A and 6B are diagrams illustrating a burst signal waveform for the spiral servo pattern in accordance with the present embodiment.
Figure 6B:
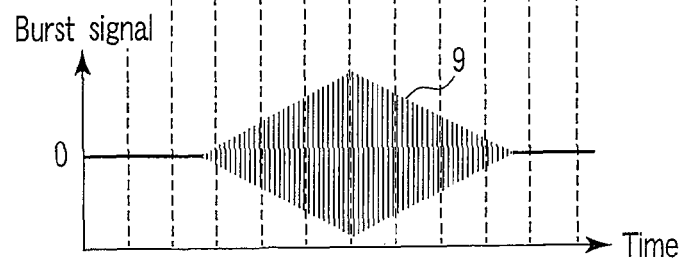

FIG. 6B is a diagram showing a burst signal waveform 9 obtained when spiral servo patterns 8 shown in FIG. 6A are read by the read head 120R. Here, a rhombic burst signal 9 is obtained when the width of the write head having written the spiral servo pattern 8 to the disk medium is the same as that of the read head 120R.

However, in actuality, the width of the read head 120R is generally relatively small compared to that of the write head having written the spiral servo pattern 8 to the disk medium. Thus, the read head 120R reads a hexagonal burst signal waveform 11 as shown in FIG. 7B. FIG. 7A shows a spiral servo pattern 10 read by the read head 120R.

(Head Positioning Control)

With reference to FIGS. 8 to 15B, description will be given of a method of controlling positioning of the head 120 on the basis of the hexagonal burst signal waveform 11.

Figure 9:
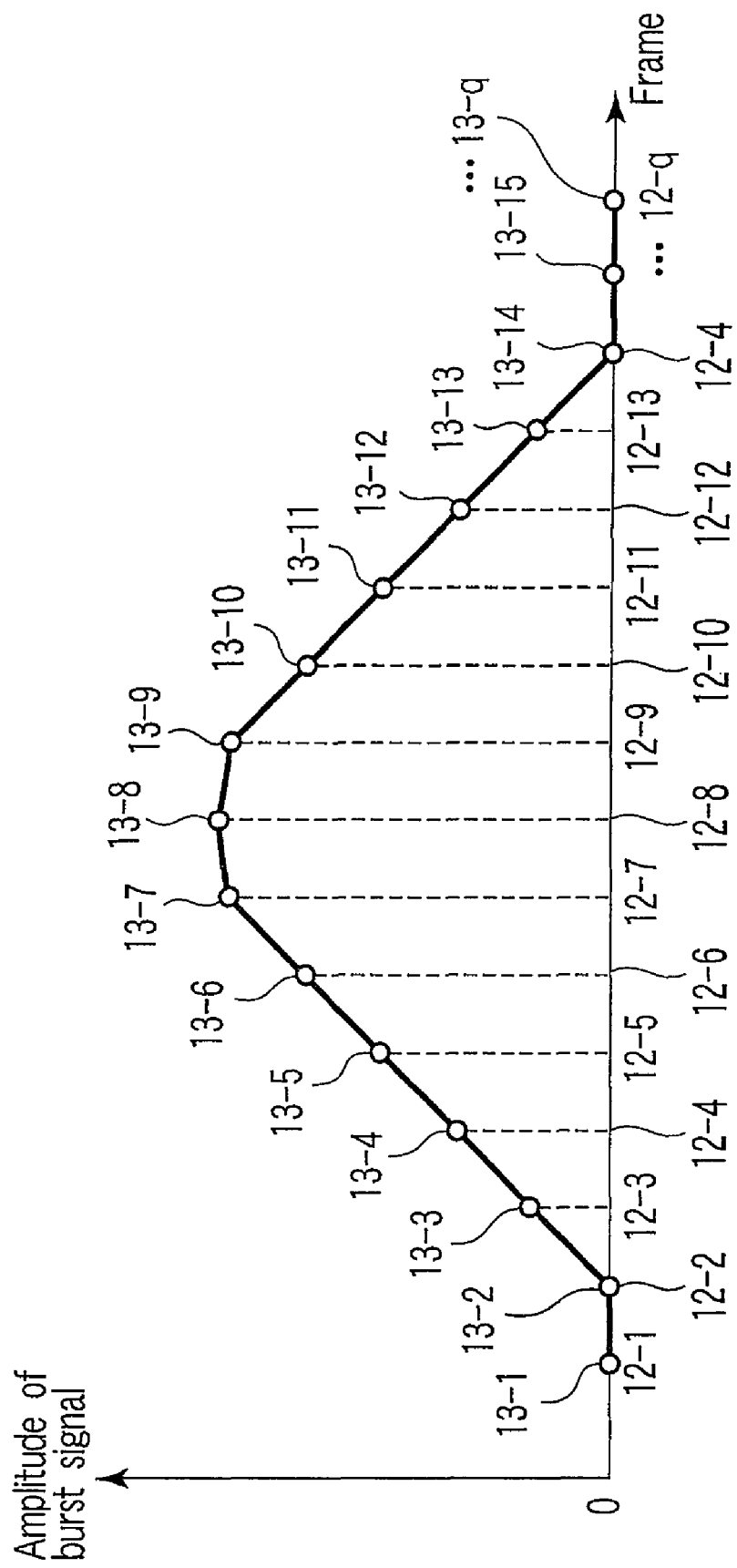
FIG. 9 is a diagram illustrating a hexagonal burst signal waveform in accordance with the present embodiment.

As shown in FIG. 8, the disk drive reproduces the hexagonal burst signal 11 at timings for respective regions (frames 12-1 to 12-q) into which the signal is temporally divided in the scanning direction of the read head 120R. The servo processing section 160 generates amplitudes 13-1 to 13-q of the burst signal 11 at frames 12-1 to 12-q, respectively, as shown in FIG. 9.

Figures 10A, 10B, 10C:
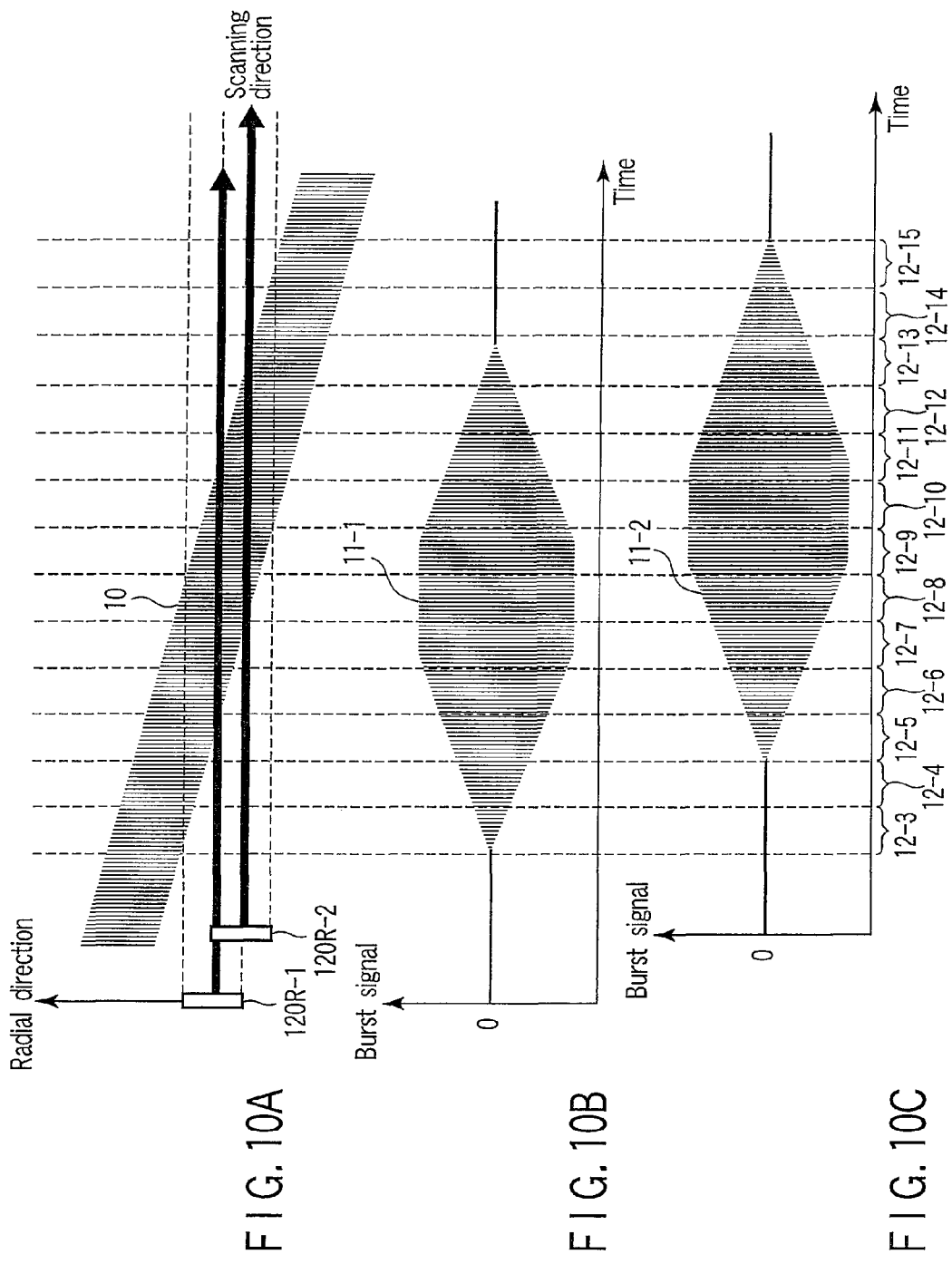
FIGS. 10A to 10C are diagrams showing a variation in hexagonal burst signal waveform in accordance with the present embodiment.

Here, FIGS. 10A to 10C are diagrams showing a variations in burst signal reproduced from the spiral servo pattern 10 when the radial position of the read head 120R varies. That is, when the read head 120R shown in FIG. 10A is at position 120R-1, a burst signal waveform 11-1 as shown in FIG. 10B is obtained. In contrast, when the read head 120R moves to position 120R-2, a burst signal waveform 11-2 obtained has the same hexagonal shape but is displaced in the direction of time as shown in FIG. 10C.

Figure 11:
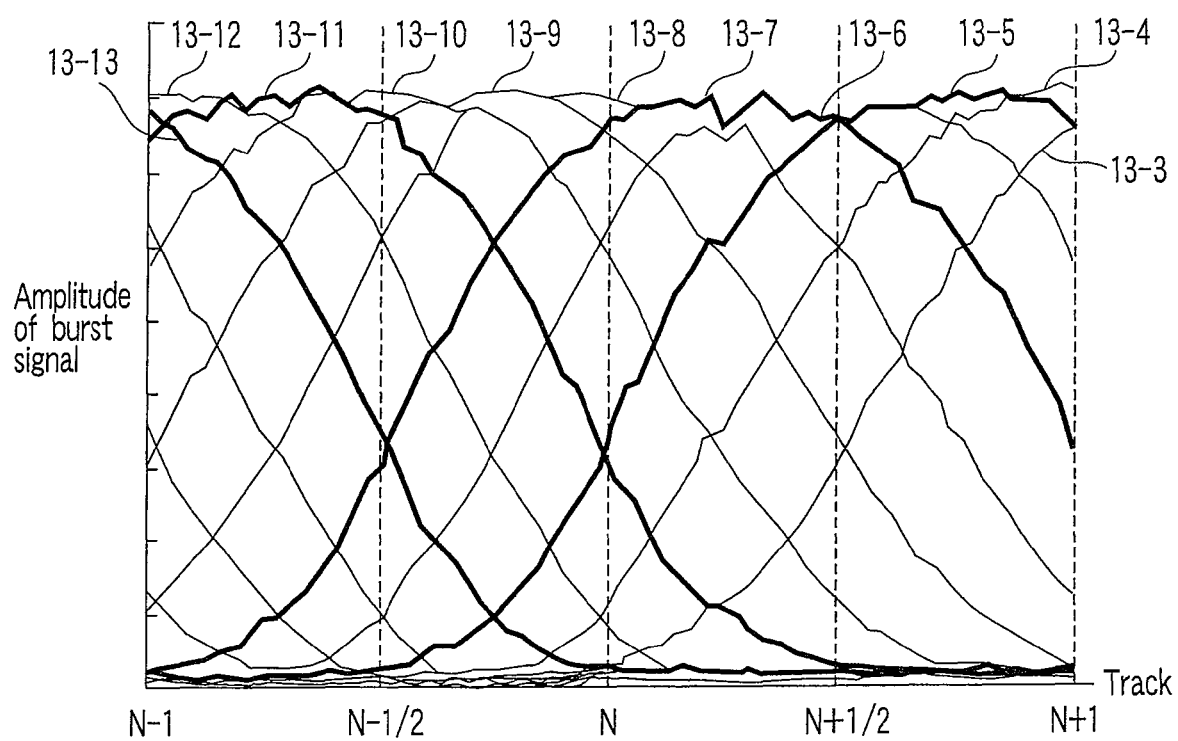
FIG. 11 is a diagram showing variations in the amplitude of hexagonal burst signals for frames in accordance with the present embodiment.

FIG. 11 is a diagram showing variations in the amplitudes (magnitudes) of burst signals for the frames with respect to the radial direction of the disk medium. Here, the abscissa indicates the concentric tracks composed of the concentric servo patterns. That is, FIG. 11 shows variations in the amplitudes of burst signals obtained when the read head 120R reads the spiral servo patterns 10 while tracking the center lines of the concentric tracks.

Here, attention is paid to amplitudes 13-5 and 13-11 of burst signals corresponding to the frames crossing each other in the vicinity of a track N and amplitudes 13-7 and 13-13 of burst signals corresponding to the frames crossing each other in the vicinity of a track N-½.

Figure 12:
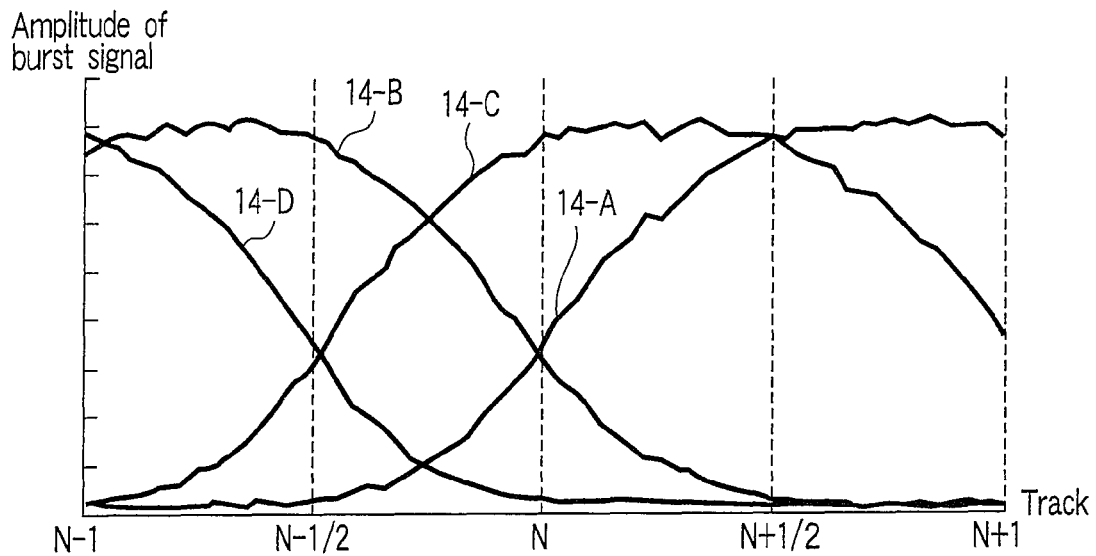
FIG. 12 is a diagram showing variations in the amplitudes of hexagonal burst signals for selected frames with respect to the radial direction in accordance with the present embodiment.
Figure 13:
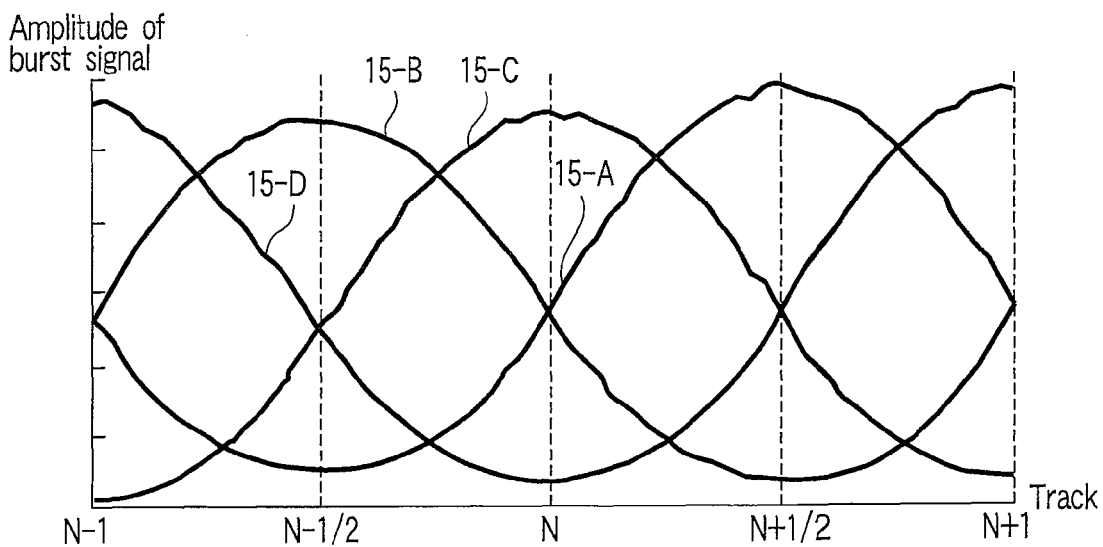
FIG. 13 is a diagram showing variations in the amplitude of servo burst signals in accordance with the present embodiment.

FIG. 12 shows variations in amplitudes 14-A to 14-D of burst signals for selected four frames with respect to the radial direction. FIG. 13 shows variations in amplitudes 15A to 15-D of servo burst signals A to D for the concentric servo patterns. Comparison of FIG. 12 with FIG. 13 indicates that the characteristics of the intersecting points between the burst signals and changes in amplitude are similar in the region from the vicinity of the track N-½ to the vicinity of the track N.

FIG. 14 shows the result 16 of calculation of a position error using amplitudes 14-A to 14-D of the burst signal corresponding to the selected frames shown in FIG. 12. In FIG. 14, a dotted line 17 shows ideal linearity.

That is, the CPU 170 uses the amplitude values of the burst signals reproduced from the multi-spiral servo pattern for the respective frames to perform a position error calculation using servo burst signals A to D for the concentric servo patterns. The CPU 170 controls the position of the read head 120R (tracking) on the basis of the calculation result.

Specifically, the CPU 170 executes an algorithm that performs such a position error calculation as shown in Equations 4 to 6.

$$pos1 = (A-B)/(|A-B|+|C-D|) \quad (4)$$

$$pos2 = ((A-B)*|A-B|)/(|A-B|^2+|C-D|^2) \quad (5)$$

$$POS = ((pos1*k)+((1024-k)*pos2))/1024 \quad (6)$$

In the equations, POS denotes the position error obtained by the averaging calculation in which the weighting factors (K: 0 to 1024) are added to the calculation results of Equations 1 and 2, where A to D mean the amplitudes of servo burst signals A to D for the respective frames, |X| means the absolute value of X, "^2" means a square operation, and * means multiplication.

FIG. 14 shows that the result 16 of calculation of the position error exhibits the ideal linearity between the vicinity of the track N-½ and the vicinity of the track N. The result means that the position error can be accurately calculated within the above range and that within this range, the frames are appropriately associated with amplitudes A to D of the servo burst signals.

Figures 15A, 15B:
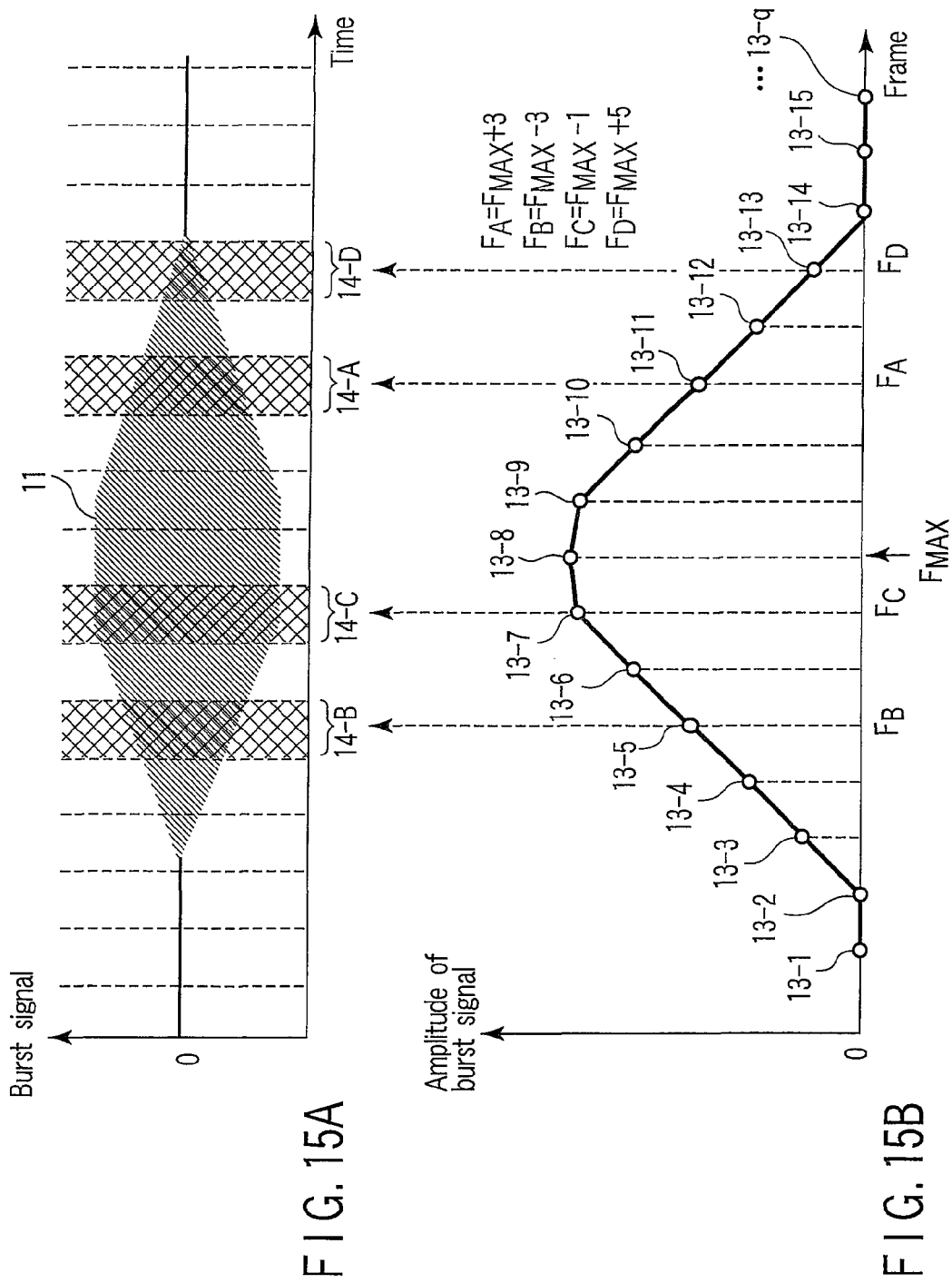
FIGS. 15A and 15B are diagrams showing the association between the burst signals and the frames in accordance with the present embodiment.

FIG. 15B is a diagram showing a method of associating the amplitude values of the hexagonal burst signal 11 shown in FIG. 15A with the respective selected frames.

As shown in FIGS. 15A and 15B, with the same multi-spiral servo pattern (the same width and inclination), the frames can be associated with amplitudes A to D of the servo burst signal even with a change in track. On the basis of a frame number corresponding to the maximum value ($F_{MAX}$) of amplitudes 13-1 to 13-q of the burst signal 11 for the respective frames, amplitudes A to D (hereinafter referred to as bursts A to D) of the servo burst signal are associated with the frame numbers as described below.

Here, in the vicinity of track N, the frame number corresponding to the maximum value of the magnitudes of the burst signal for the respective frames is assumed to be frame 8. Then, the frame number associated with burst A is frame 11 (8+3). The frame number associated with burst B is frame 5(8−3). The frame number associated with burst C is frame 7(8−1). The frame number associated with burst D is frame 13(8+5). Therefore, the following relationship can be obtained.

When the frame number corresponding to the maximum of the amplitudes of the burst signal for the respective frames is assumed to be $F_{MAX}$, the frame number to be associated with burst A is "$F_A = F_{MAX} + 3$" as shown in FIG. 15B. The frame number to be associated with burst B is "$F_B = F_{MAX} - 3$". The frame number to be associated with burst C is "$F_C = F_{MAX} - 1$". The frame number to be associated with burst D is "$F_D = F_{MAX} - 5$".

Thus, even with a change in track, bursts A to D of the servo burst signals can be easily associated with the frame numbers simply by changing the frame number $F_{MAX}$ corresponding to the maximum value.

As described above, when the hexagonal burst signals are reproduced from the multi-spiral servo pattern to position the read head 120R on one of the concentric tracks, the present embodiment makes it possible to apply the position error calculation using servo burst signals A to D for the concentric servo patterns. Consequently, the disk drive 100 enables the servo self-write operation of writing the concentric servo patterns that can constitute the concentric tracks, to the disk medium 1 having the multi-spiral servo pattern as burst patterns.

In summary, the present embodiment can provide a disk drive that enables the burst signals reproduced from the spiral servo patterns to be applied to the head position error calculating scheme based on the concentric servo patterns. This allows the positioning of the head to be controlled on the basis of the spiral servo patterns without providing any special function.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
a disk medium on which spiral servo patterns are recorded;
a head including a read head which reads data from the disk medium and a write head which writes data to the disk medium;
a head moving unit which moves the head radially over the disk medium;
a unit which reproduces burst signals of a particular shape from the spiral servo patterns read by the read head while the head is scanning circumferential regions on the rotating disk medium which correspond to concentric tracks;
a generator which generates position data associating servo burst signals contained in concentric servo patterns constituting the concentric tracks with the burst signals of the particular shape;
a position error calculating unit which uses the position data to perform a position error calculation required to position the head on one of the concentric tracks; and
a controller which uses a result of the calculation performed by the position error calculating unit to control the head moving unit and thus positioning of the head,
wherein the generator divides each of the burst signals of the particular shape into a plurality of regions in a circumferential direction to generate position data associating amplitudes obtained from the respective regions with position signals A and B reproduced from the servo burst signals and used to calculate an error in a position with respect to a center line of each of the concentric tracks and position signals C and D reproduced from the servo burst signals and used to calculate an error in a position with respect to an adjacent track boundary.

2. The disk drive according to claim 1, further comprising a servo writing unit which uses the write head included in the head controllably positioned by the controller to write the concentric servo patterns to the disk medium.

3. The disk drive according to claim 1, wherein each of the burst signals of the particular shape has a hexagonal burst signal waveform.

4. The disk drive according to claim 1, wherein the plurality of regions are frames temporally divided in a scanning direction of the read head.

* * * * *